Patented Aug. 2, 1938

2,125,683

UNITED STATES PATENT OFFICE 2,125,683

PRINTING INK

Cyril Frederick Percy Millar, Chorlton on Medlock, Manchester, England

No Drawing. Application December 30, 1935, Serial No. 56,830. In Great Britain November 27, 1935

4 Claims. (Cl. 134—17)

This invention concerns a process for manufacturing products for working up into printing inks which consists in subjecting charges of vulcanized rubber containing fabric and/or vulcanized rubber preferably under agitation to heat applied at a temperature and for a time sufficient to bring about a decomposition of the rubber and carbonization or destruction as such of the fabric if present and liberating the heated masses from objectionable pungent matters.

According to one embodiment of the invention the charges of vulcanized rubber containing fabric and/or vulcanized rubber and one or more oils including vegetable and mineral oils preferably under agitation are subjected to agitation during a heat treatment applied at a temperature and for a time sufficient to bring about a decomposition of the rubber and carbonization or destruction as such of the fabric if present and/or liberation of the objectionable pungent matters from the heated masses.

The heat treatment may be effected under pressure.

According to another embodiment the charges of vulcanized rubber containing fabric and/or vulcanized rubber with or without the addition of one or more oils and preferably under agitation are subjected to a distilling operation and the heated masses are then liberated from objectionable pungent matters.

The distilling operation should be carried out at temperatures sufficiently high to carbonize or destroy the fabric if present but it is advantageous to maintain the temperature below 575° F. and it has been found in operation that decomposition of the rubber commences at or about 250° F.

The distilling operation is complete when the residue is still in a freely flowing condition at the temperatures referred to and the fabric if present has been carbonized or destroyed.

A simple test to ascertain the state of carbonization or destruction of the fabric is to examine the condensate.

When carbonization or destruction of the fabric commences water appears in substantial quantities in the condensate and it is not until the condensate is 95 per cent clear oil that carbonization or destruction is practically complete.

Examples of the oils which may be used are crude fuel oils and linseed oil.

The liberation of the objectionable pungent matters is an important feature of the invention because it has been found that when the products are worked up into inks they give off pungent and acrid fumes in use. Unless therefore the pungent matters are removed from the products, printing inks prepared therefrom are not satisfactory in commerce and do not find favour in the printing industry.

According to the invention the liberation of the objectionable pungent matters from the heated masses is preferably effected by blowing superheated steam for example at a temperature of about 475° F. through the heated masses in a separate vessel. If desired however the superheated steam might be utilized during or subsequent to the heat treatment in the same vessel. The liberation of the objectionable pungent matters from the masses may be effected in other known ways such as with the aid of a vacuum or by neutralization.

The products resulting from the treatments may be ground so as to form printing inks or they may be worked up with oily materials and if desired usual components of printing inks including pigments or gums or varnishes or siccatives or toning materials or mixtures of any of the same. The invention is deemed to include printing inks when prepared from the products obtained in accordance with the process herein described.

The following description serves to illustrate by way of example only how the products for working up into printing inks may be obtained.

A charge of preclaimed pieces of scrap vulcanized rubber containing approximately 20 per cent of fabric such as old motor car tyres etc. and 20 per cent by weight of a mineral oil having a specific gravity of about 0.970 is subjected in a retort provided with stirring means to a distilling operation under agitation at temperatures raised gradually to about 525° F. and this temperature is substantially maintained until the charge is in a freely flowing condition and any fabric present has been carbonized or destroyed as such according to the test hereinbefore referred to. The gases and vapours given off are passed through a condenser system. The condensate which usually represents about 20 per cent of the charge may be used as a fuel for the distilling operation or for other purposes. The charge is passed to another vessel and subjected to a deodorizing process by blowing superheated steam therethrough. The steam is superheated to about 475° F. The outgoing steam carries off gases and fractions of pungent matters. The steaming operation is continued until a sample of the condensate is free from objectionable odours.

Upon an analysis of the cold product there should be found approximately 25 to 35 per cent of pigment and 75 to 65 per cent of vehicle.

The resultant product may if desired be blended with other batches to secure greater uniformity. When cooled the resultant product assumes a plastic condition. It may be subjected to milling or grinding and then constitutes a printing ink.

To meet the requirements of printing ink manufacturers the resultant products may be worked up as by milling with oily materials and the usual substances including pigments or gums or varnishes or siccatives or toning materials or mixtures of any of the same may be added.

What I claim is:—

1. A process for manufacturing products for working up into printing inks which comprises the steps of subjecting a charge of vulcanized rubber containing fabric and at least one oil selected from the group consisting of vegetable and mineral oils to the action of agitation and distillation by heat, stopping the distillation while the residue is still in a freely flowing condition and blowing superheated steam at a temperature above 450° F. through the residue in a separate vessel to remove objectionable pungent matters.

2. A process for manufacturing products for working up into printing inks, comprising heating a charge of vulcanized rubber containing fabric and at least one oil selected from the group consisting of vegetable and mineral oils, while agitating, to temperatures of from 250 to 575° F. for a time sufficient to effect decomposition of the rubber and carbonization of the fabric, stopping the heating while the residue is in a freely flowing condition, and then blowing superheated steam through the residue to remove objectionable pungent matters.

3. A process for manufacturing products for working up into printing inks, comprising heating a charge of vulcanized rubber containing about 20% of fabric and about 20% by weight of at least one oil selected from the group consisting of vegetable and mineral oils, while agitating, to temperatures of from 250 to 575° F. for a time sufficient to effect decomposition of the rubber and carbonization of the fabric, stopping the heating while the residue is in a freely flowing condition, and then blowing superheated steam through the residue to remove objectionable pungent matters.

4. A process for manufacturing products for working up into printing inks, comprising heating a charge of vulcanized rubber containing about 20% of fabric and about 20% by weight of a mineral oil having a specific gravity of about 0.970, while agitating, to effect distillation, gradually raising the temperature to about 525° F., substantially maintaining said temperature until the charge is in a freely flowing condition and all fabric present is carbonized, and then blowing steam superheated to a temperature of about 475° F. through the residue until the condensed evolved vapors are free from objectionable odors.

CYRIL FREDERICK PERCY MILLAR.